United States Patent
Schmidt (12) 
(10) Patent No.: US 6,491,599 B1
(45) Date of Patent: Dec. 10, 2002

(54) TWO-MODE, COMPOUND-SPLIT, ELECTRO-MECHANICAL, VEHICULAR TRANSMISSION PARTICULARY ADAPTED FOR TRACK-LAYING VEHICLES

(75) Inventor: Michael Roland Schmidt, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 49 days.

(21) Appl. No.: 09/697,098

(22) Filed: Sep. 15, 2000

(51) Int. Cl.[7] .................................................. F16H 3/72
(52) U.S. Cl. ..................... 475/5; 475/6; 475/8; 475/18; 475/28
(58) Field of Search .............................. 475/5, 6, 8, 18, 475/28

(56) References Cited

U.S. PATENT DOCUMENTS

| | | | | |
|---|---|---|---|---|
| 5,363,937 A | * | 11/1994 | James ........................ | 180/192 |
| 5,509,491 A | * | 4/1996 | Hall, III ..................... | 180/9.44 |
| 5,571,058 A | | 11/1996 | Schmidt ...................... | 475/5 |
| 5,916,050 A | * | 6/1999 | Coutant et al. ............ | 475/5 |
| 5,931,757 A | | 8/1999 | Schmidt ...................... | 475/2 |
| 6,090,005 A | * | 7/2000 | Schmidt et al. ............ | 475/5 |

* cited by examiner

Primary Examiner—Charles A Marmor
Assistant Examiner—Eric M. Williams
(74) Attorney, Agent, or Firm—Leslie C. Hodges (57) ABSTRACT

A two-mode, compound-split, electro-mechanical transmission that selectively receives power from an internal combustion engine as well as a source of electrical energy. Three power receiving planetary gear subsets, first and reverse mode selecting planetary gear subsets, a steering planetary gear subset and left and right output planetary gear subsets are employed. A steering mechanism operates a steering motor. Torque transfer devices selectively ground components of the first and second mode selecting planetary gear subsets. The left and right output planetary gear subsets present corresponding out shafts. The left and right output planetary gear subsets are connected to each other by a shaft which assures simultaneous rotation of one component in the left and right output planetary gear subsets. Another component of the left and right output planetary gear subsets are connected to each other by a retro-rational gear shaft assembly.

5 Claims, 5 Drawing Sheets

TWO-MODE, COMPOUND-SPLIT, ELECTRO-MECHANICAL, VEHICULAR TRANSMISSION PARTICULARY ADAPTED FOR TRACK-LAYING VEHICLES

TECHNICAL FIELD

The present invention relates broadly to vehicular transmissions. In general, the present invention relates to two-mode, compound-split, vehicular transmissions. More particularly, the present invention relates to two-mode, compound-split, vehicular transmissions that utilize supplemental power receiving/delivery units that derive their power from an on-board source of electrical energy. Specifically, the present invention relates to a two-mode, compound-split, electro-mechanical, vehicular transmission wherein the interactive planetary gear subsets are operatively connected to an engine and two power receiving/delivery units—motor/generators, as shown—that may be annularly configured to minimize the overall envelope within which the transmission is contained, but whereas such concentricity may be desirable to conserve space, it is not critical to the operation of the invention. A power delivering shaft extends axially within the transmission to deliver driving power to left and right output planetary gear subsets from which respective left and right output shafts project to drive the track, or even the wheels, that propel the vehicle.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven.

As explained in detail in U.S. Pat. No. 5,931,757 issued on Aug. 8, 1999, and assigned to General Motors Corporation, the challenge is to provide a power system that will operate at high efficiencies over a wide variety of operating conditions. Desirable electric variable transmissions should leverage not only the benefits of a series, hybrid transmission for desirable low-average power duty cycles—i.e.: low speed start/stop duty cycles—but also the benefits of a parallel hybrid transmission for high-average output power, high speed duty cycles.

To this point in time, a highly respected hybrid transmission for a tracklaying vehicle has been a four-mode, input-split, parallel transmission that is the subject of U.S. Pat. No. 5,571,058 which issued on Nov. 5, 1996, and was also assigned to General Motors Corporation.

By way of background, in a parallel arrangement the power supplied by the engine and the power supplied by the source of electrical energy are independently connected to the drive members. Perfecting a concept wherein multiple modes, or gear trains, are available for synchronous selection by the on-board computer to transmit power from the engine and/or selected supplemental power receiving/delivery units, such as motor/generators, to the output shaft results in a hybrid transmission having an extremely wide range of applications, the many beneficial results of which may be achieved by the use of a variable, two-mode, input-split, electro-mechanical transmission.

However, and particularly for use in a military track vehicle, the electrical auxiliary loads (also commonly referred to as the "hotel" loads) can require a high percentage of the engine power. Hence, if one additionally desires to provide for "silent operation" of the vehicle under certain conditions, the electrical receiving/delivery units must transfer power from and, if batteries are employed as the source of electrical power, to the source of electrical energy to power not only the means to move the vehicle but also the power required to satisfy the hotel loads. If motor/generators are employed the resulting power required properly to operate such a vehicle precludes a reduction in the size of the motor/generators. A two-mode, compound-split transmission has been an excellent choice for development with many commercial vehicles, particularly inasmuch as such a transmission does provide a mechanical point in the first forward mode of operation, and that helps meet the cooling requirements at low vehicle speeds. However, that transmissions used in commercial vehicles typically do not have an independent reverse mode, nor are the versions of transmissions adapted for commercial vehicles readily capable of providing silent operation for the vehicle in which they are used.

Nevertheless, by incorporating the present invention in a two-mode, compound-split, electro-mechanical transmission it becomes a very attractive package, particularly for track-laying military vehicles, even with all their attendant operational requirements.

SUMMARY OF THE INVENTION

It is, therefore, one primary aspect of the present invention to provide a new and novel, two-mode, compound-split, electro-mechanical transmission that is particularly suited for driving track-laying vehicles.

It is another aspect of the present invention to provide a novel, two-mode, compound-split, electro-mechanical transmission, as above, wherein the transmission utilizes separate clutches for selecting the reverse and first mode forward ranges.

It is a further aspect of the present invention to provide a novel, two-mode, compound-split, electro-mechanical transmission, as above, wherein the transmission may employ either concentric or countershaft power receiving/delivery units such as motor/generators.

It is a still further aspect of the present invention to provide a novel, two-mode, compound-split, electro-mechanical transmission, as above, wherein the steering motor does not need its own generator.

It is yet another aspect of the present invention to provide a novel, two-mode, compound-split, electro-mechanical transmission, as above, wherein the transmission employs a disconnect clutch to permit stealth operation with the engine off and disconnected from the transmission so that operational power is provided solely from the source of electrical power through the supplemental power receiving/delivery units.

It is a still further aspect of the present invention to provide a novel, two-mode, compound-split, electro-mechanical transmission, as above, wherein the transmission provides a mechanical point in both the forward first mode range and the reverse range to assist with the low speed cooling requirements.

These and other aspects of the invention, as well as the advantages thereof over existing and prior art forms, which will be apparent in view of the following detailed specification, are accomplished by means hereinafter described and claimed.

By way of a general introductory description, a two-mode, compound-split, electro-mechanical transmission embodying the concepts of the present invention is particularly adapted for use with track-laying vehicles. The transmission utilizes a plurality of planetary gear subsets, and each planetary gear subset has a plurality of components in the nature of an inner, sun gear, an outer, ring gear circumscribing said inner, sun gear and a plurality of planet gears rotatably mounted on a carrier such that the planet gears each simultaneously mesh with the inner, sun gear and the outer, ring gear of the planetary gear subset in which that carrier is incorporated.

The transmission receives its operating power from several sources. There is a prime mover power source in the nature of an internal combustion engine. There is a source for storing and providing electrical energy, and there are first and second power receiving and delivery units. There is a steering motor and a steering mechanism for operating the steering motor. The source for storing and providing electrical energy, the steering mechanism, the steering motor and the first and second power receiving and delivery units communicate with each other by virtue of an electrical control unit.

The planetary gear subsets include left and right output planetary gear subsets, each of which present an output shaft. The left and right planetary gear subsets are connected to each other by a retro-rotational gear and shaft assembly so that the left and right output shafts may selectively rotate in the same or in opposite directions and at the same or at different speeds, one with respect to the other.

To acquaint persons skilled in the arts most closely related to the present invention, one representative preferred embodiment of a two-mode, compound-split, electro-mechanical transmission now contemplated for putting the invention into practice is described herein by, and with reference to, the annexed drawings that form a part of the specification.

It must be understood that the aforesaid exemplary form of a preferred two-mode, compound-split, electro-mechanical transmission is described in detail without attempting to show all of the various forms and modifications of the essential elements in which the invention might be embodied.

As such, the embodiment shown and described herein is only illustrative, and as will become apparent to those skilled in these arts can be modified in numerous ways within the spirit and scope of the invention; the invention being measured by the appended claims and not by the details of the specification.

DESCRIPTION OF THE PREFERRED EMBODIMENT

The present invention may, with relatively modest changes, be conveniently incorporated in a two-mode, compound-split, electro-mechanical transmission such as that to which U.S. Pat. No. 5,931,757, issued on Aug. 8, 1999, and assigned to General Motors Corporation, is directed. On the other hand, a hybrid transmission particularly adapted to incorporate the concepts of the present invention is designated generally by the numeral 10 on the accompanying drawings.

Figure 1:
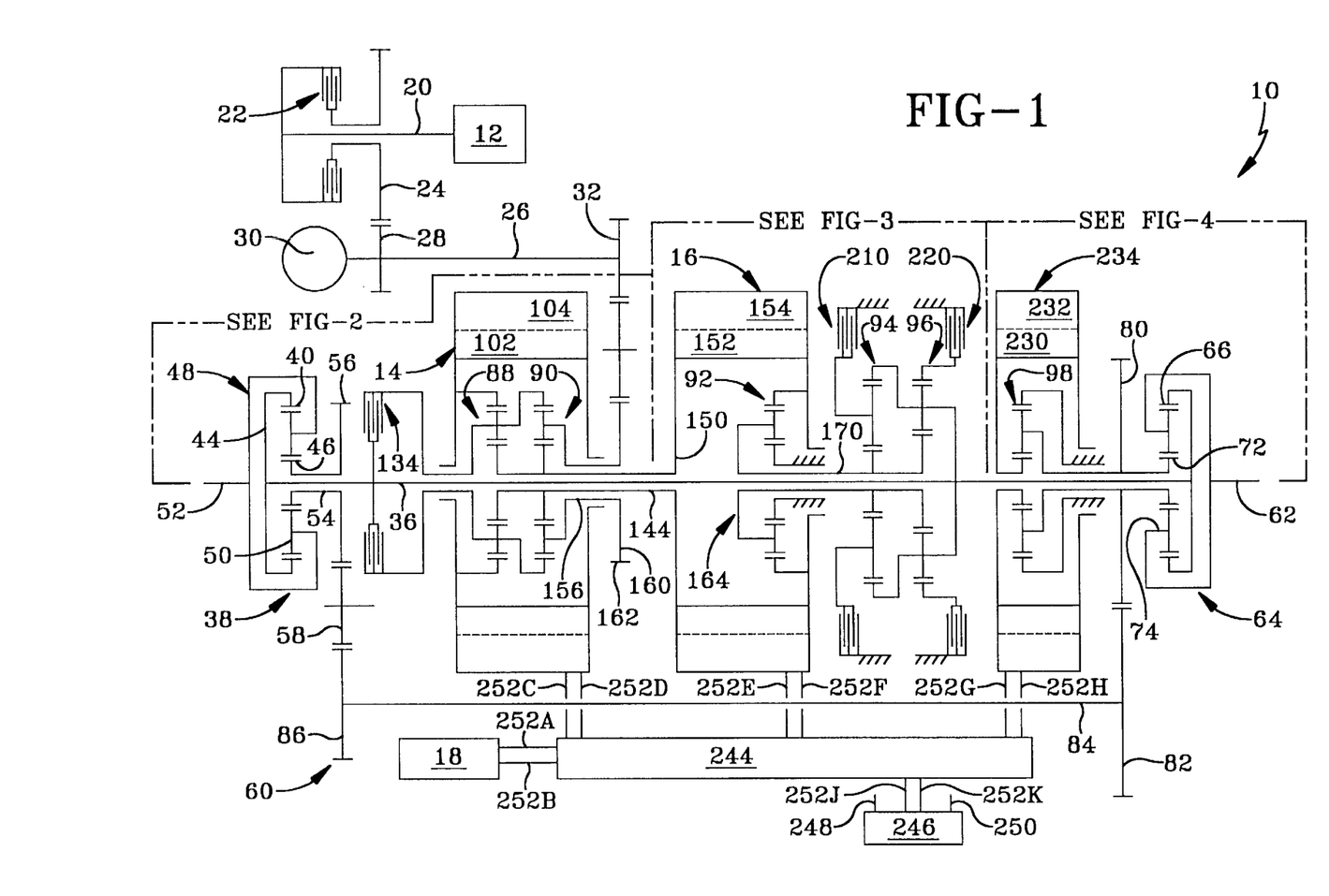
FIG. 1 is a schematic representation of one preferred form of a two-mode, compound-split, electro-mechanical transmission embodying the concepts of the present invention.

With particular reference to FIG. 1, it will be observed that the improved hybrid transmission 10 may be driven by an internal combustion engine 12 and/or by first and second motor/generator units 14 and 16. In the embodiment depicted the engine 12 may be a fossil fuel engine, such as a diesel engine which is readily adapted to deliver its available power output at a constant number of revolutions per minute (RPM). Because the hybrid transmission 10 is uniquely suitable for use in conjunction with heavy, track-laying vehicles such as military battle tanks (even those weighing on the order of 65 tons) it should be appreciated that an appropriate engine 12 can, after start-up and during the majority of its output, operate at a constant speed of approximately 2800 RPM to deliver something on the order of 1200 horsepower.

When the motor/generators 14 and 16 operate as motors to provide power to the hybrid transmission 10 they receive electric power from an electrical energy supply, or storage, source 18. The source of electrical power 18 may be one or more batteries. Other electric storage devices that have the ability to store electric power and dispense electric power may be used in place of the batteries without altering the concepts of the present invention. In fact, with some modifications, even a source of electrical power such as a fuel cell may be utilized, in which situation the disclosed motor/generator units 14 and 16 would need to perform only as motors and not as generators.

In the aforesaid exemplary track-laying embodiment for which the hybrid transmission 10 is uniquely suitable, the motor/generators 14 and 16 should, when operating as motors, be capable of supplying power at a continuous rating of about 680 horsepower at a maximum of approximately 4400 RPM while delivering a moment force something on the order of 6000 foot-pounds at stall. Thus, if the source 18 of electrical energy constitutes batteries or a substitute therefor, the source 18 should be capable of providing at least 600 horsepower for those occasions when the internal combustion engine 12 is not providing power so that the vehicle will be capable of moving solely by electrical power.

As best depicted in FIG. 1, the engine 12 has an output shaft 20 that may be connected, through a disconnect clutch in the form of torque transfer device 22, to an engine output drive gear 24. A transfer shaft 26 supports a power input gear 28 that meshingly engages the engine output drive gear 24. One end of the transfer shaft 26 may drive the transmission pump 30, and the opposite end of the transfer shaft 26 presents a transfer gear 32 that may be operatively connected to the transmission 10 though an idler gear 34, as will be hereinafter more fully described.

With continued reference to FIG. 1, but with more particular initial reference to FIG. 2, the transmission 10 incorporates a plurality of hereinafter described planetary gear subsets that may circumscribe a longitudinally extending power delivery shaft 36 to provide a concentric arrangement, if desired. One end of the power delivery shaft 36 is operatively connected to a first, or a left, output planetary gear subset 38, as shown. The left output planetary gear subset 38 employs an outer gear member 40, typically designated as the ring gear, that may be presented from the circumferential interior of an annular hub 42. The annular hub 42 extends axially from a connecting flange 44 that extends radially outwardly from the power delivery shaft 36. As shown, the outer gear member 40 may extend radially inwardly from the interior of the annular hub 42 an appropriate distance operatively to engage the hereinafter described gear members of the first, or left as depicted, output planetary gear subset 38.

Figure 2:
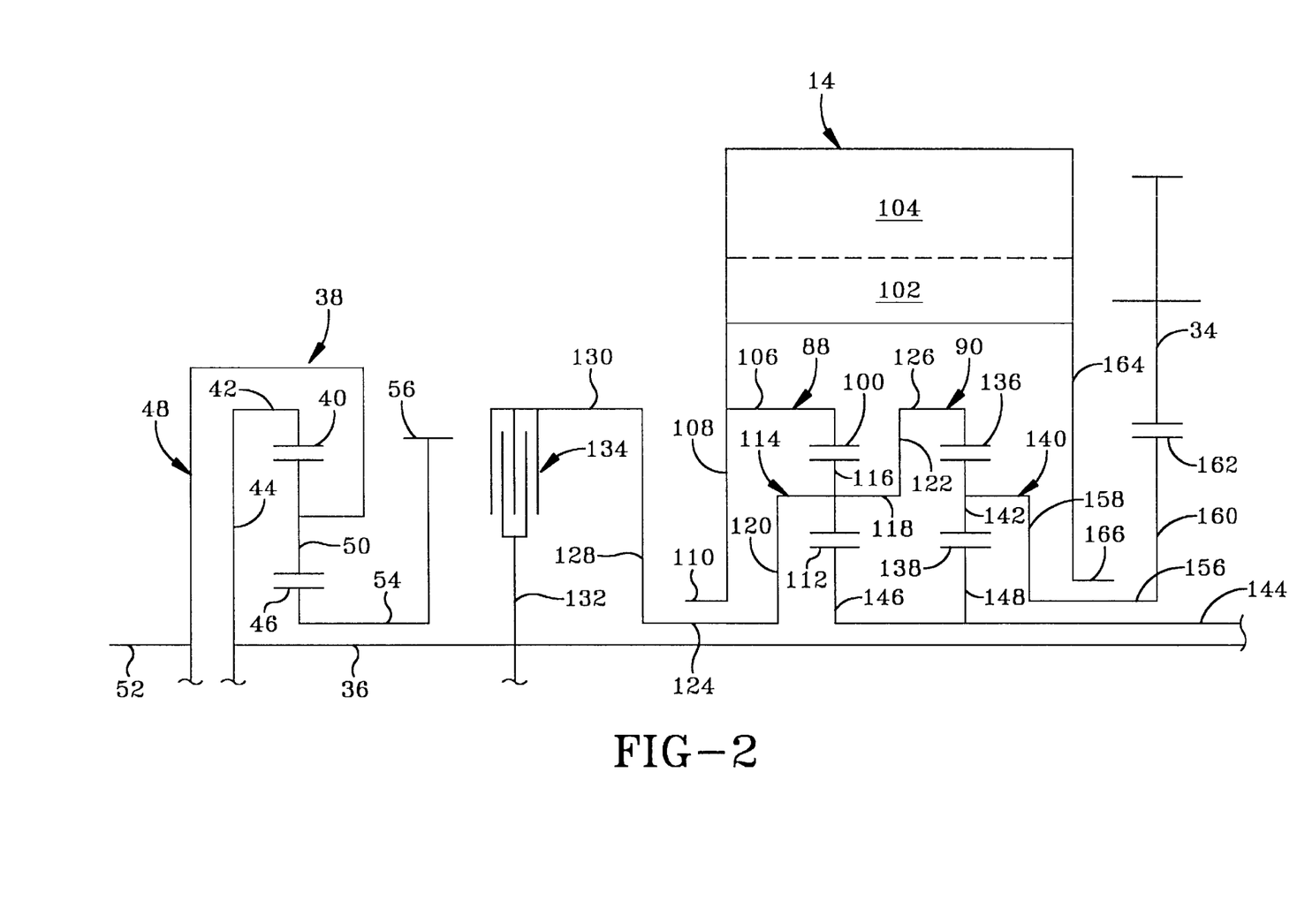
FIG. 2 is an enlarged, similarly presented schematic representation of that portion of FIG. 1 defined by a chain-line rectangle designated as "SEE FIG. 2"

As best seen in FIG. 2, the outer, ring gear 40 circumscribes an inner gear member 46, typically designated as the sun gear. A carrier assembly 48 rotatably supports a plurality of planet gears 50 that simultaneously, and meshingly, engage both the outer, ring gear member 40 and the inner, sun gear member 46 of the left output planetary gear subset 38. The carrier assembly 48 of the left output planetary gear subset 38 presents an axially extending output shaft 52 for driving the wheels, track or whatever propels the vehicle on the left side of the vehicle (not shown) in which the transmission is incorporated. Because the wheels, track and even the vehicle itself are not critical to the invention, they are, therefore, not depicted in the drawings.

Figure 4:
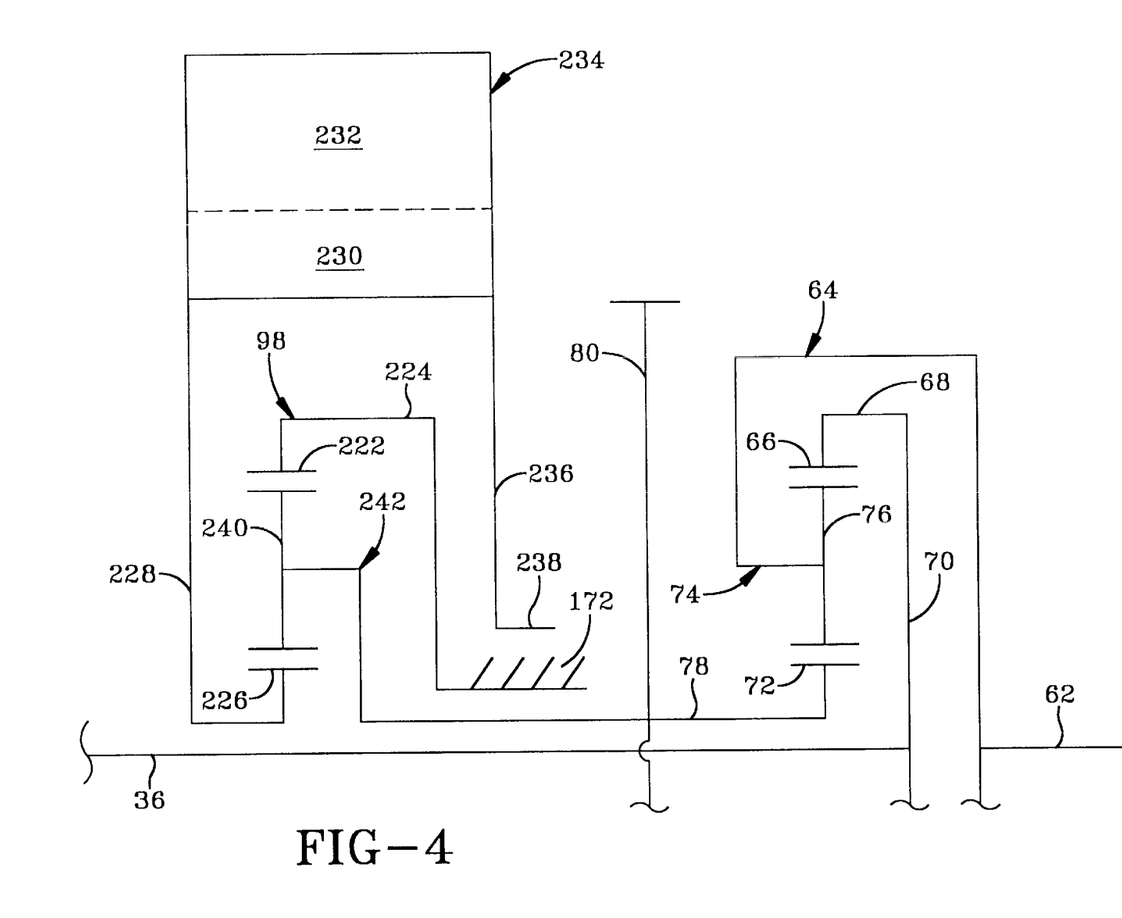
FIG. 4 is an enlarged, similarly presented schematic representation of that portion of FIG. 1 defined by a chain-line rectangle designated as "SEE FIG. 4"; and, FIG. 5 is a graphical depiction of the engine and motor/generator speeds in Revolutions per Minute plotted against the vehicle speed in Miles per Hour.

The inner, sun gear member 46 of the output planetary gear subset 38 is presented from an annular sleeve 54 that relatively rotatably circumscribes the power delivery shaft 36 and itself presents a radially oriented connecting gear 56 that meshingly engages an idler gear 58 (FIG. 1). The idler gear 58, as is hereinafter more fully explained, is one component of a gear and shaft assembly 60 that effects desired differential rotation between the left output shaft 52 and a second, or right, output shaft 62 hereinafter described in conjunction with a second, or right, output planetary gear subset 64, as best seen in FIG. 4. This differential rotation may, as will be hereinafter more fully described, be as to the rotational direction and/or the rotational rate.

With reference, therefore, to FIG. 4, the second end of the power delivery shaft 36 is operatively connected to the second, or right, output planetary gear subset 64. The second output planetary gear subset 64 also employs an outer gear member 66, typically designated as the ring gear. Here, too, the outer, ring gear member 66, is presented from an annular collar 68 that extends axially from the circumferential exterior of a connecting flange 70 that extends radially outwardly from the power delivery shaft 36. The outer gear member 66 may, like its counterpart in the left output planetary gear subset 38, extend radially inwardly from the interior of the annular collar 68 an appropriate distance operatively to engage the hereinafter described gear members of the second output planetary gear subset 64. Specifically, the outer, ring gear 66 circumscribes an inner gear member 72, typically designated as the sun gear. A carrier assembly 74 rotatably supports a plurality of planet gears 76 that simultaneously, and meshingly, engage both the outer, ring gear member 66 and the inner, sun gear member 72 of the second output planetary gear subset 64. The carrier assembly 74 presents the axially extending second, or right, output shaft 62 for driving the wheels, track or whatever mechanical arrangement is employed for propelling the vehicle on the right side thereof.

The inner, sun gear member 72 of the second output planetary gear subset 64 is presented from an annular sleeve 78 that rotatably circumscribes the power delivery shaft 36. In addition to presenting the inner, sun gear 72, the sleeve 78 also presents a radially oriented connecting gear 80 that meshingly engages a transfer gear 82 (FIG. 1) presented from one end of a transfer shaft 84 that is part of the gear and shaft assembly 60. The opposite end of the transfer shaft 84 presents a second transfer gear 86 which meshingly engages the idler gear 58 that is operatively associated with the first, or left, output planetary gear subset 38, as previously described and as best depicted in FIG. 1.

With continued general reference to FIG. 1, the hybrid transmission 10 utilizes three power distributing planetary gear subsets 88, 90 and 92. The hybrid transmission 10 also employs a reverse mode selecting planetary gear subset 94 and a first mode selecting planetary gear subset 96. Still another planetary gear subset 98 is employed to effect steering, as will be hereinafter more fully described.

The first of the power distributing planetary gear subset 88, as also best depicted in FIG. 2, employs an outer gear member 100, typically designated as the ring gear, that is presented from a rotor 102 that rotates interiorly of a stator 104 in the first motor/generator unit 14. Specifically, an annular gear support 106 projects axially from the medial portion of a flange plate 108 that extends radially between an annular balance hub 110 located at the inner terminus of the flange plate 108 and the rotor 102 of the first motor/generator unit 14. The outer, ring gear member 100 is presented from the radially interior of the annular gear support 106, and the outer, ring gear 100 is disposed to circumscribe an inner gear member 112, typically designated as the sun gear.

The first power distributing planetary gear subset 88 incorporates a carrier assembly 114 that rotatably supports a plurality of planet gears 116 on appropriate axially extending shaft portions 118 such that each planet gear 116 simultaneously, and meshingly, engages both the outer, ring gear member 100 and the inner, sun gear member 112 of the first, power distributing planetary gear subset 88. The carrier assembly 114 also includes radial offset plates 120 and 122. Offset plate 120 extends radially inwardly from the shaft portions 118 to terminate in an annular inner sleeve shaft 124 that rotatably circumscribes the power delivery shaft 36 and is itself rotatably circumscribed by the annular, balance hub 110 at the radially inner extent of the flange plate 108 presented from the rotor 102 of the first motor/generator unit 14. Offset plate 122 extends radially outwardly from the support shafts 118 to terminate in an annular collar 126 that serves to compound the first and second power distributing planetary gear subsets 88 and 90, respectively.

The annular inner sleeve shaft 124 is also secured to a radially extending connector plate 128, the radially outer extent of which presents an annular flange 130 that is selectively conjoined to a rib 132 that extends radially outwardly from the power delivery shaft 36. The selective operative connection is effected by a torque transfer device 134 that, as will be hereinafter more fully described, is employed to select the second mode in the two-mode operation of the hybrid transmission 10.

With continued reference to FIG. 2, the second power distributing planetary gear subset 90 also employs an outer gear member 136, typically designated as the ring gear, that is presented from the carrier assembly 114 of the first power distributing planetary gear subset 80. Specifically, the outer ring gear 136 of the second power distributing planetary gear subset 90 is presented from the cylindrical interior of the annular collar 126 on the carrier assembly 114 of the first power distributing planetary gear subset 88. The outer, ring gear 136 of the second power distributing planetary gear subset 90 circumscribes an inner gear member 138, typically designated as the sun gear. A carrier 140 rotatably supports a plurality of planet gears 142 such that each planet gear 142 simultaneously, and meshingly, engages both the outer, ring gear member 136 and the inner, sun gear member 138 of the second, power distributing planetary gear subset 90.

Figure 3:
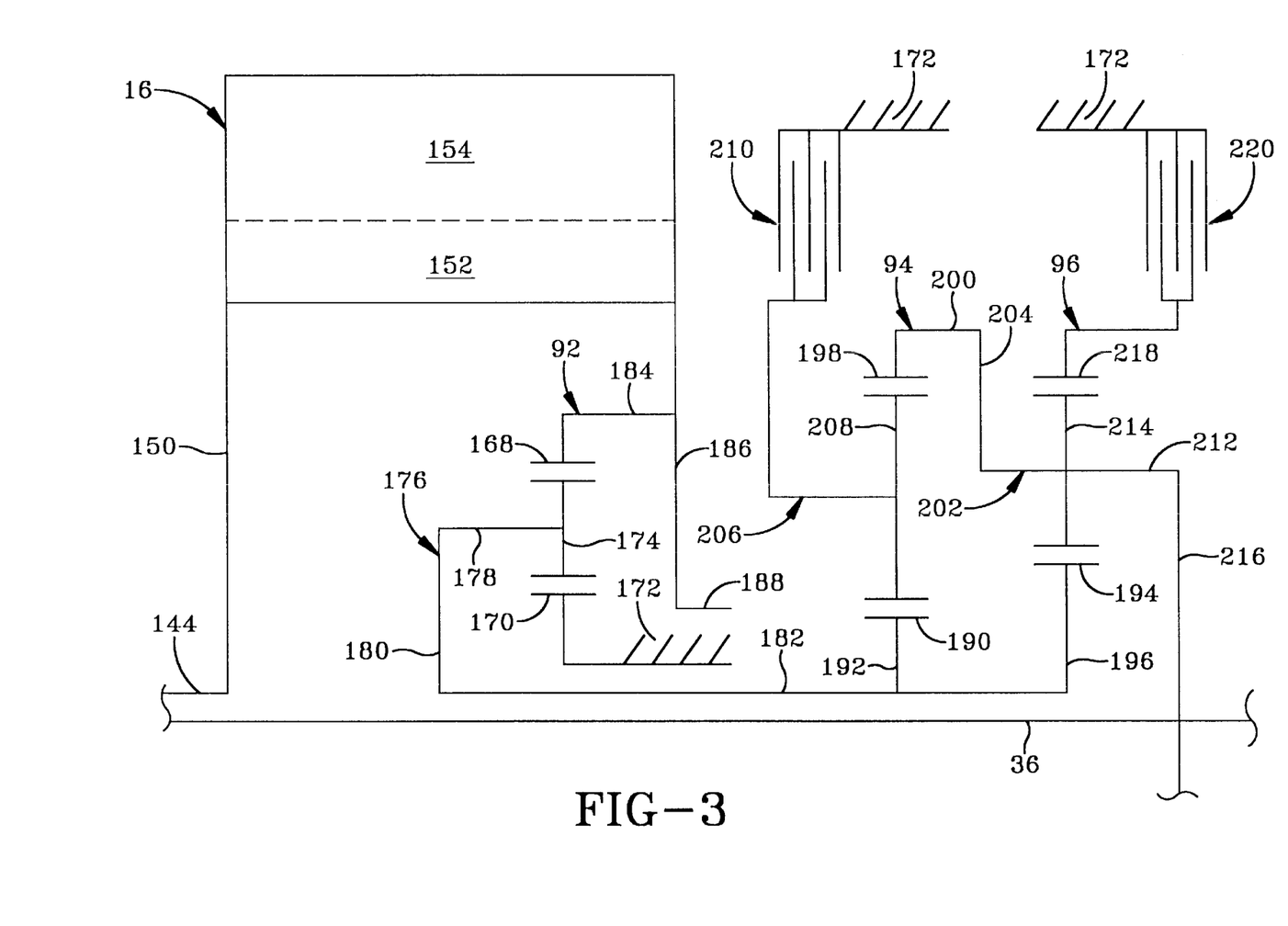
FIG. 3 is an enlarged, similarly presented schematic representation of that portion of FIG. 1 defined by a chain-line rectangle designated as "SEE FIG. 3"

The inner, sun gear members 112 and 138 of the first and second power distribution planetary gear subsets 88 and 90, respectively, are conjoined in that they are both presented from an annular sleeve shaft 144 that rotatably circumscribes the power delivery shaft 36. Specifically, and as best seen in FIG. 2, a first, rib plate 146 extends radially outwardly from one end of the sleeve shaft 144, and the inner, sun gear member 112 of the first, power distribution planetary gear subset 88 is presented from the first rib plate 146. A second, rib plate 148 extends radially outwardly from the medial portion of said sleeve shaft 144, and the inner, sun gear member 138 of the second, power distribution planetary gear subset 90 is presented from the second, rib plate 148. With reference now to FIG. 3, a radial flange 150 connects the rotor 152 that rotates radially inwardly of the stator 154 in the second motor/generator 16 to the sleeve shaft 144.

The carrier 140 (FIG. 2) includes a sleeve 156 that rotatably circumscribes sleeve shaft 144. In addition, the carrier 140 includes a first disk plate 158 that extends radially outwardly from one end of the sleeve 156 to permit the planet gears 142 to rotate radially outwardly from the sleeve 156. The carrier 140 also includes a second disk plate 160 that extends radially outwardly from the opposite end of the sleeve 156 to present a gear member 162 that meshingly engages the idler gear 34.

A second flange 164 extends radially inwardly from the rotor 102 of the first motor/generator unit 14 and terminates in an annular, balance hub 166 that rotatably circumscribes the concentric, relatively rotatable, sleeves 156 and 144. The two axially spaced balance hubs 110 and 166 assist in dynamically balancing the rotor 102 of the first motor/generator 14 during its rotation.

As depicted in FIG. 2, the first and second power distribution planetary gear subsets 88 and 90 may be located axially between the flanges 108 and 164 attached to the rotor 102 of the first motor/generator 14 and thus concentrically inwardly thereof.

Turning now to the third power distributing planetary gear subset 92, as best seen from FIG. 3, it also has an outer, ring, gear member 168 which circumscribes an inner, sun, gear member 170 that is rotatably grounded to the housing 172 of the hybrid transmission 10. A plurality of planet gear members 174 are rotatably mounted on a carrier 176 such that each planet gear 174 meshingly, and simultaneously, engages both the outer, ring gear member 168 and the inner, sun gear member 170. Specifically, the carrier 176 includes a supporting shaft 178 for each planet gear 174, and the supporting shafts 178 are supported from a disk plate 180 that extends radially outwardly from a sleeve shaft 182 which rotatably circumscribes the power delivery shaft 36.

The sleeve shaft 182 serves to compound the third power distributing planetary gear subset 92 with both the reverse mode selecting planetary gear subset 94 and the first mode selecting planetary gear subset 96.

At this point it should be recognized that the outer, ring gear 168 of the third power distributing planetary gear subset 92 is presented from an annular collar 184 that extends axially from a flange plate 186 which extends radially between a radially inner, annular balance hub 188, located at the inner terminus of the flange plate 186, and the rotor 152 of the second motor/generator 16.

It will be observed that the inner, sun gear member 190 of the reverse mode selecting planetary gear subset 94 is presented from a flange plate 192 that extends radially outwardly from the medial portion of the sleeve shaft 182 included in carrier 176 incorporated in the third power distributing planetary gear subset 92. In addition, the inner, sun gear member 194 of the first mode selecting planetary gear subset 96 is presented from a flange plate 196 that extends radially outwardly from that end portion of the sleeve shaft 182 opposite from that end at which the disk plate 180 extends radially outwardly with respect to the sleeve shaft portion 182 of carrier 176.

Thus, the third power distributing planetary gear subset 92, the reverse mode selecting planetary gear subset 94 and the first mode selecting planetary gear subset 96 are compounded by virtue of the fact that the carrier 176 of the third power distributing planetary gear subset 92 includes the sleeve shaft 182 that is secured not only to the inner, sun gear 190 of the reverse mode selecting planetary gear subset 94 but also to the inner sun gear 194 of the first mode selecting planetary gear subset 96.

The outer, ring gear member 198 of the reverse mode selecting planetary gear subset 94 is supported from an annular collar 200 connected directly to the carrier 202 of the first mode selecting planetary gear subset 96 by an offset plate 204. The carrier 206 of the reverse mode selecting planetary gear subset 94 rotatably supports a plurality of planet gears 208 that are in continuous meshing engagement with the outer, ring gear 198 and the inner, sun gear 190 of the reverse mode selecting planetary gear subset 94. The carrier 206 is selectively grounded to the housing 172 of the hybrid transmission 10, as by a torque transfer device 210, to preclude rotation of the carrier 206 when selecting reverse operation.

The carrier 202 of the first mode selecting planetary gear subset 96 also presents a plurality of supporting shafts 212 on which the planet gears 214 are rotatably mounted, and the supporting shafts 212 are, in turn, secured between the offset plate 204 and a rib plate 216 that extends radially outwardly from the power delivery shaft 36. An outer, ring gear 218 circumscribes the inner, sun gear 194 of the first mode selecting planetary gear subset 96, and the aforesaid sun and ring gears 194 and 218, respectively, are in continuous meshing engagement with the planet gears 214. The outer ring gear 218 is selectively grounded to the housing 172 of the hybrid transmission 10, as by a torque transfer device 220, to preclude rotation of the outer ring gear 218 when selecting the first mode of forward operation.

It should be understood that whereas all five planetary gear subsets 88, 90, 92, 94 and 96 are "simple" planetary gear subsets in their own right, but to reiterate, the first and second planetary gear subsets 88 and 90 are compounded in that the inner, sun gears 112 and 138 of the respective first and second power distributing planetary gear subsets 88 and 90 are conjoined by virtue of the sleeve shaft 144 (FIG. 2). The first and second power distributing planetary gear subsets 88 and 90 are further conjoined in that the outer, ring gear 136 of the second power distributing planetary gear subset 90 is continuously connected to the carrier 114 of the first power distributing planetary gear subset 88. The first, second and third power distributing planetary gear subsets 88, 90 and 92, respectively, are compounded in that the outer, ring gear 168 (FIG. 3) of the third power distributing planetary gear subset 92 is continuously connected to the inner, sun gears 112 and 138 of the respective first and second power distributing planetary gear subsets 88 and 90 through the rotor 152 of the second motor/generator 16. With continued reference to FIG. 3, the third power distributing planetary gear subset 92, the reverse mode selecting planetary gear subset 94 and the first mode selecting planetary gear subset 96 are compounded by virtue of the sleeve shaft 182, and the reverse and first mode selecting planetary gear subsets 94 and 96 are further conjoined by virtue of the carrier 202 of the first mode selecting planetary gear subset 96 being continuously joined to the outer, ring gear 198 of the reverse mode selecting planetary gear subset 94.

Turning now to the steering planetary gear subset 98 (FIG. 4), the outer, ring gear member 222 is rotatably grounded to the housing 172 of the hybrid transmission 10 by an angled supporting bracket 224. The outer ring gear member 222 circumscribes an inner, sun gear member 226 that is secured to a stirrup flange 228 which extends radially inwardly from the rotor 230 that rotates within stator 232 of the steering motor 234. A stabilizing brace 236 also extends radially inwardly from the rotor 230 of the steering motor 234 to terminate in a hub 238 that may rotatably engage a portion of housing 172 in order to assure stabilization the rotor 230 in the steering motor 234 against undesirable vibrations.

A plurality of planet gears 240 simultaneously, and continuously, meshingly engage the outer, ring gear 222 and the inner, sun gear 226 of the steering planetary gear subset 98. The planet gears 240 are supported from a carrier 242 that is, in turn, supported from the annular sleeve 78 that rotatably circumscribes the power delivery shaft 36 to present the inner, sun gear 72 of the right output planetary gear subset 64.

The operator of a vehicle in which the subject hybrid transmission 10 is incorporated has four primary devices to control the transmission. One of the primary control devices is a well known drive range selector (not shown) that directs an electrical control unit (ECU) 244 to configure the transmission for the park or neutral conditions, the forward or reverse drive ranges. The second and third primary control devices constitute an accelerator pedal (not shown) and a brake pedal (also not shown). In many installations these are the only control devices that feed information to the ECU 244. However, when the hybrid transmission 10 is installed in a track-laying vehicle a steering input mechanism 246 may be employed. A typical steering input mechanism 246 may incorporate a pair of pivotal levers 248 and 250 to create the signal exported from the steering input mechanism 246 to the ECU 244.

The information obtained by the ECU 244 from these four primary control sources will hereinafter be referred to as the "operator demand." The ECU 244 also obtains information from both the first and second motor generators 14 and 16, respectively, as well as the engine 12, and the electrical power supply device 18. In response to an operator's action, the ECU 244 determines what is required and then manipulates the components of the hybrid transmission 10 appropriately in response to the operator demand.

In the embodiment disclosed the electrical power supply device 18 communicates with an electrical control unit (ECU) 244 by transfer conductors 252A and 252B. The ECU 244 communicates with the first motor/generator 14 by transfer conductors 252C and 252D, and the ECU 244 similarly communicates with the second motor/generator 16 by transfer conductors 252E and 252F. The ECU 244 communicates with the steering motor 234 by transfer conductors 252G and 252H and with the steering input mechanism 246 by transfer conductors 252J and 252K.

As apparent from the previous paragraph, a particular structural member, component or arrangement may be employed at more than one location. When referring generally to that type of structural member, component or arrangement, a common numerical designation is employed. However, when one of the structural members, components or arrangements so identified is to be individually identified, it will be referenced by virtue of a letter suffix employed in combination with the numerical designation employed for general identification of that structural member, component or arrangement. Thus, there are at least ten transfer conductors which are generally identified by the numeral 252, but the specific, individual transfer conductors are, therefore, identified as 252A, 252B, 252C, 252D, 252E, 252F, 252G, 252H, 252J and 252K in the specification and on the drawings.

The electric control unit (ECU) 244 controls the power flow between and among the electric power storage device 18, the first and second motor/generators 14 and 16, the steering motor 234 and the steering input mechanism 246 through the aforesaid transfer conductors 252.

The ECU 244 also manipulates each motor/generator 14 and 16 to act as either a motor or a generator and selectively engages, or disengages, each torque transfer device 22, 210 and/or 220 in a well known manner. In addition, the ECU 244 receives and analyzes information from the transmission components and the vehicle operator and correspondingly manipulates the transmission components to comply with that information.

When the hybrid transmission 10 is installed in a track-laying vehicle, the steering input mechanism 246 may be provided to regulate at least the rotational direction of each output shaft 52 and 62—and thereby the direction of movement which each, individual track imposes on the vehicle. In some installations one might elect to incorporate the accelerator function in the movement of the pivotal levers 248 and 250, but for a clear understanding as to the function of the hybrid transmission 10 it is only necessary to discuss the directional movement of the tracks in response to the movement of the levers 248 and 250. Controlling acceleration of the vehicle will, therefore, be assumed to be solely within the province of a well known accelerator.

Accordingly, the steering input mechanism 246 applies input signals from the operator to the ECU 244 through conductors 252J and 252K, and those signals are relayed to the steering motor 234 through transfer conductors 252G and 252H. The steering input mechanism 246 is typically provided with two, pivotal control levers—i.e.: a left lever 248 and a right lever 250—that pivot forwardly and rearwardly within their respective vertical planes. It should be understood, however, that steering per se can easily be accomplished with a customary steering wheel (not shown) so long as the input signals from the steering wheel match those that would be supplied from the pivotal control levers 248 and/or 250.

Operation—Steering with Engine Either Off or Disconnected

It should be understood that steering a vehicle with the hybrid transmission 10 can be accomplished not only with the vehicle moving either forwardly or rearwardly but may also be initiated when the vehicle is at rest. That is, the vehicle may be pivoted either clockwise or counterclockwise while not moving either forwardly or rearwardly. Moreover, steering such a vehicle can be accomplished with both the engine 12 and the electric supply device 18 cooperatively providing the requisite driving power or even with only the electric supply device 18 providing the driving power. This ability to effect steering by using only power provided from the electric supply device 18 is particularly useful with military vehicles inasmuch as it permits "silent" operation. That is, with the vehicle at rest and with the internal combustion engine 12 either off or disconnected from the hybrid transmission, as by disengaging the torque transfer device 22, the vehicle operator may pivot the vehicle so that it faces in a new direction—with or without moving the vehicle either forwardly or rearwardly.

To accomplish the foregoing result, the electric supply device 18 can operate the two motor/generator units 14 and 16 as well as the steering motor 234 to receive and respond to input signals generated by the steering input mechanism 246 in response to the operator's movement of the pivot levers 248 and/or 250. Simultaneously, or sequentially, the operator may supply input through a well known drive range selector and accelerator (neither of which are shown). When the vehicle is thus configured for silent mode operation the operator can, for example, pivot the track-laying vehicle from a dead stop to a selected direction and then move the vehicle either forwardly or rearwardly.

In order to clarify the operation of the steering components, an explanation as to how the hybrid transmission 10 pivots a track-laying vehicle either clockwise or counterclockwise from a dead stop without utilization of the internal combustion engine 12 will lay the groundwork for an understanding as to how the steering similarly operates when the internal combustion engine 12 is operating and is supplying power to the transmission 10 through the torque transfer device 22.

Specifically, therefore, In order to pivot the vehicle to, for example, the left (counterclockwise) by virtue of the steering input mechanism 246, the driver would pivot the right pivotal lever 250 forwardly, while allowing pivotal lever 248 to remain in its normal at rest position. The aforesaid actuation of the lever 250 will provide the same result as rotating a steering wheel counterclockwise. Whichever input device would be employed, the resulting steering input signal will cause the right output shaft 62 to drive the right track forwardly by virtue of the interaction between the steering planetary gear subset 98 and the right output planetary gear subset 64 in response to the operation of the steering motor 234.

Continuing with the assumption that driving power is being supplied solely by the electric supply device 18, it will be observed that the outer ring gear 222 (FIG. 4) of the steering planetary gear subset 98 is grounded against rotation by the support bracket 224. Hence, appropriate directional rotation of the rotor 230 in the steering motor 234 effects rotation of the sun gear 226 in the steering planetary gear subset 92 so as to force the planet gears 240 to walk along the inner circumference of the grounded outer ring gear 222 of the steering planetary gear subset 98 and thereby force rotation of the sun gear 72 in the output planetary gear subset 64 (by virtue of the annular sleeve 78) in the same direction as the carrier 242 is being rotated by rotor 230 in steering motor 234.

Forward pivotal displacement of the right lever 250 causes rotor 230 of the steering motor 234, and therefore the sun gear 72, to rotate in that direction which will result in movement of the track on the right side of the vehicle in a direction that imparts a driving force between the track on the right side of the vehicle and the surface over which the vehicle in moving, and thus the surface engaged by the right track, which urges that side of the vehicle to move forwardly. Simultaneously, the connecting gear 80 mounted on annular sleeve 78 will rotate concurrently with the sun gear 72, and that rotation drives the transfer gear 82 in the gear and shaft assembly 60—and therefore the transfer shaft 84 and the transfer gear 86 on opposite ends of the transfer shaft 84—counter to the rotational direction of the connecting gear 80. As a result, when the rotation of the transfer shaft 86 is fed through idler gear 58 to the connecting gear 56, the annular sleeve 54 and the sun gear 46 in the left output planetary gear subset 38 will be forced to retro-rotate relative to the rotational direction of the sun gear 72. Because of this retro-rotation of sun gears 72 and 46 and the fact that the outer ring gears 40 and 66 of the respective left and right output planetary gear subsets 38 and 64 are fixed to the power delivery shaft 36 so that they must rotate in unison, the left output shaft 52 will rotate in the direction that imparts a driving force between the track on the left side of the vehicle and the surface over which the vehicle is moving, and thus the surface engaged by the left track, which urges that side of the vehicle to move rearwardly.

This resultant counter-rotation of the output shafts 52 and 62, together with the resulting counter-rotation of the tracks driven by the two output shafts 52 and 62, will cause the vehicle to pivot to the left (counterclockwise) for so long as the right lever 250 is pivotal displaced forwardly.

When the right pivot lever 250 is returned to its neutral, at rest position the vehicle stops its pivotal rotation. Apart from the foregoing steering result the vehicle, in its new orientation, will then either remain stationary or move forwardly or rearwardly in response to whichever input signals are received from the well known drive range selector and accelerator.

Were the left lever 248 to be pivoted forwardly, while allowing pivotal lever 250 to remain in its normal at rest position, the vehicle would pivot to the right (clockwise) inasmuch as such movement of lever 248 will simply reverse the rotational direction of the rotor 230 in the steering motor 234, and all the components of the interconnected output planetary gear subsets 38 and 64 would each simply rotate in the opposite direction from that heretofore described for achieving a left (counterclockwise) pivotal movement of the vehicle.

Operation—Moving Forwardly or Rearwardly from a Dead Stop

To continue with an explanation as to how steering is effected while the vehicle is already moving, let us first consider how the vehicle is moved either forwardly or rearwardly from a dead stop.

In the exemplary embodiment of the hybrid transmission 10 depicted, when the operator has selected a forward drive range and manipulates either the accelerator pedal or the brake pedal, the ECU 244 determines if the vehicle should accelerate or decelerate. The ECU 244 also monitors the state of the power sources, and determines the output of the transmission required to effect the desired rate of acceleration or deceleration. Under the direction of the ECU 244 the transmission is capable of providing a range of output speeds from slow to fast in order to meet the operator demand.

To reiterate, the transmission 10 is a two-mode, compound-split, electro-mechanical, vehicular transmission. In other words, the output shafts 52 and 62 receive power through two distinct gear trains within the transmission 10. A first mode, or gear train, is selected when the torque transfer device 220 is actuated in order rotationally to "ground" the outer gear member 218 of the first mode selecting planetary gear sub-set 96. A second mode, or gear train, is selected when the torque transfer device 220 is released and the torque transfer device 134 is simultaneously actuated to connect the power delivery shaft 36 to the carrier 144 of the first power distributing planetary gear sub-set 88.

Those skilled in the art will appreciate that the ECU 244 serves to provide a range of output speeds from relatively slow to relatively fast within each mode of operation. This combination of two modes with a slow to fast output speed range in each mode allows the transmission 10 to propel a vehicle from a stationary condition to it its highest speeds while satisfying the other objects of the invention. Additionally, the ECU 244 coordinates operation of the transmission 10 so as to allow synchronized shifts between the modes. Operation of the preferred embodiment will now be described as it relates to full power operation inasmuch as that approach will fully describe the general operational concepts.

a. First Mode

In the first mode of operation, and when the ECU 244 has determined that the operator desires to move forwardly from a stationary condition, and to accelerate, the torque transfer device 22 is engaged operatively to connect the engine 12 to the hybrid transmission 10, and torque transfer device 22, as well as torque transfer device 220, remain applied as the vehicle moves forwardly through a speed range hereinafter more fully described.

Operating as a motor, the rotor 152 of the second motor/generator 16 rotates to drive the outer ring gear 168 in the third power distributing planetary gear subset 92 to drive the carrier 176 in that planetary gear subset and, through sleeve shaft 182, the sun gear 194 of the first mode selecting planetary gear subset 96 so as to walk the planet gears 214 along the rotatably grounded ring gear 218 to drive the carrier 202, and thereby the power delivery shaft 36. Rotation of the shaft 36 effects concurrent rotation of the ring gear 66 in the right output planetary gear subset 64 as well as the ring gear 40 in the left output planetary gear subset 38 in the same direction. When there is no steering input, the sun gears 46 and 72 in the left and right output planetary gear subsets 38 and 64, respectively, remain stationary so that rotation of the ring gears 40 and 66 in the respective output planetary gear subsets 38 and 64 walk the respective carriers 48 and 74 around the outer circumference of the respective sun gears 46 and 72 to rotate the output shafts 52 and 62 in unison. The rotational direction of the rotor 152 in the second motor/generator 16 was determined by the ECU 144 to effect that directional rotation of the output shafts 52 and 62 to drive both tracks in the direction chosen by the operator, which at this point is forwardly.

Figure 5:
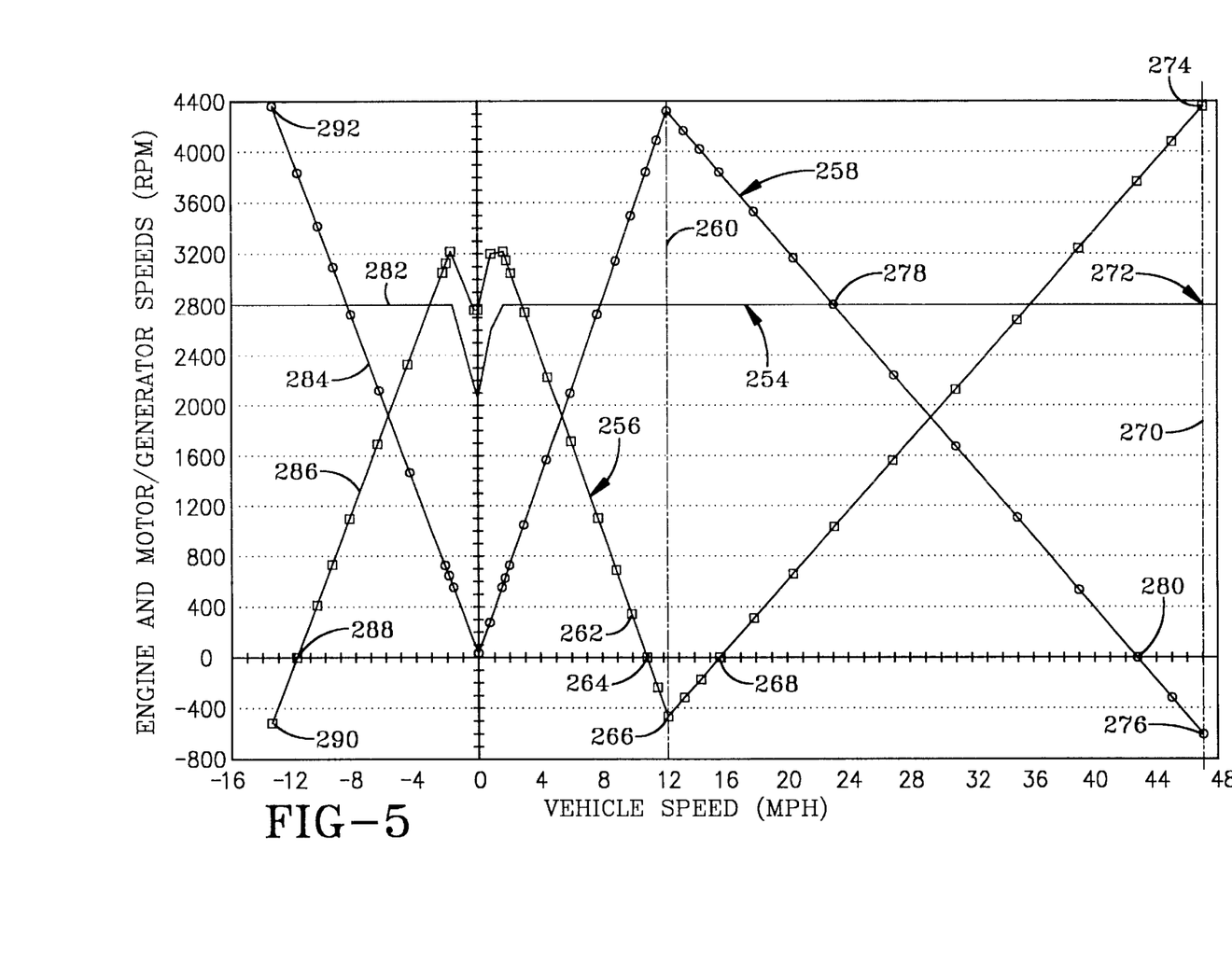

With reference to FIG. 5 curve 254 is the plot of the engine speed in revolutions per minute (RPM) against the speed in miles per hour (MPH) of the vehicle in which the engine 12 and hybrid transmission 10 are incorporated. For convenience it will be noted that curve 254 is uninterrupted by visual plot points inasmuch as the engine speed is virtually constant at about 2800 RPM when it is employed to drive the vehicle. Curve 256 is the plot of the rotational speed (RPM) of the rotor 102 in the first motor/generator 14, also relative to the speed (MPH) of the vehicle. This curve may be readily distinguished by the fact that the plot points appear as small squares. Curve 258 is the plot of the rotational speed (RPM) of the of the rotor 152 in the second motor/generator 16 relative to the speed (MPH) of the vehicle. This curve may be readily distinguished by the fact that the plot points appear as small circles.

The first operational mode of transmission 10 extends from the abscissa, which designates the rotational speed (RPM) of the two motor/generators 14 and 16 as well as the rotational speed (RPM) of the engine 12 to chain line 260 which is drawn parallel to the abscissa and which defines the shift from operation of the transmission 10 in the first mode to the second mode. In the representative embodiment described, the first mode extends from the vehicle at rest to a forward speed on the order of about 12.4 MPH. At speeds greater than about 12.4 MPH the transmission operates in the second mode, as will be hereinafter more fully described.

As previously noted, the second motor/generator 16 operates as a motor through the entire first mode—i.e.: from zero to about 12.4 MPH. The first motor/generator 14, however, operates as a generator until approximately 10 MPH—represented by plot point 262 on curve 256—and thereafter operates as a motor within the first mode.

It must also be noted that there is a mechanical point in the first mode of operation. A mechanical point occurs when either of the motor/generators is stationary at any time during operation of the transmission in either the first or second mode. The lack of a mechanical point is a drawback inasmuch as the maximum mechanical efficiency in the transfer of power from the engine to the output occurs when one of the motor/generators is at a mechanical point—i.e.: stationary. A mechanical point contributes to lower heat retention but does not inhibit the desired high tractive effort desired for steady state operation. In the vast majority of variable, two-mode, input-split, parallel, electro-mechanical transmissions, however, there is typically no mechanical point in the first mode of operation. To the contrary, in the present transmission 10, there is a mechanical point in the first mode. Specifically, and as indicated by plot point 264 on curve 256, the first motor/generator 14 is not rotating where curve 256 crosses the ordinate. Because of that mechanical point, the engine power is transferred mechanically to the output without any of the engine power being directed to the first motor/generator 14. Immediately thereafter the first motor/generator 14 no longer absorbs power to operate as a generator but rather imparts power by acting as a motor.

The aforesaid transition in the operation of the first motor/generator 14, as well as the hereinafter described operation of the second motor/generator 16, are the result of the number of teeth on the various gears within the planetary gear sub-sets which cause the speeds of the two motor/generators to reverse at various operational speeds of the vehicle.

Should one wish to duplicate the results described herein, the ring gear 100 of the first power distributing planetary gear sub-set 88 has 97 teeth, and the sun gear 112 of the first power distributing planetary gear sub-set 88 has 35 teeth. The ring gear 136 of the second power distributing planetary gear sub-set 90 has 99 teeth, and the sun gear 138 of the first power distributing planetary gear sub-set 88 has 45 teeth. The ring gear 168 of the third power distributing planetary gear sub-set 92 has 98 teeth, and the sun gear 170 of the third power distributing planetary gear sub-set 92 has 56 teeth. The ring gear 198 of the reverse mode selecting planetary gear sub-set 94 has 93 teeth, and the sun gear 190 of the reverse mode selecting planetary gear sub-set 94 has 29 teeth. The ring gear 218 of the first mode selecting planetary gear sub-set 96 has 96 teeth, and the sun gear 194 of the first mode selecting planetary gear sub-set 96 has 30 teeth. The outer gear members 40 and 66 of the respective left and right output planetary gear sub-sets 38 and 64 each have 90 teeth, and the inner gear members 46 and 72 of the respective left and right output planetary gear subsets 38 and 64 each have 28 teeth. With the configuration of the transmission 10 heretofore described, and with the aforesaid number of teeth on the inner and outer gear members, the transmission provides the aforesaid mechanical point while operating in the first mode.

To complete the description as to the operation of the exemplary hybrid transmission 10, one must consider operation of the transmission in the second mode of operation.

b. Second Mode

The transition from the first to the second mode of operation is achieved by disengaging torque transfer device 220 and simultaneously applying torque transfer device 134. Torque transfer device 22 remains engaged to provide power from engine 12 to the hybrid transmission 10. At the inception of the second mode of operation, the first motor/generator 14 transitions from operating as a motor to operating as a generator. Inasmuch as the transition from operation of the transmission 10 in the first mode to operation in the second mode occurs at line 260, the transition of the first motor/generator 14 from a motor to a generator occurs at point 266 on plot curve 256—which also delineates the intersection of the plot curve 256 with line 260. The first motor/generator 14 continues to operate as a generator during operation of the transmission 10 in the second mode while the vehicle gains speed from about 12.4 MPH to about 15 MPH. At about 15 MPH the first motor/generator 14 transitions from operation as a generator back to operation as a motor. This transition constitutes the mechanical point represented by point 268 on plot curve 256. The first motor/generator 14 continues thereafter to operate as a motor as the vehicle continues to gain speed to the top speed of the track-laying vehicle incorporating the aforesaid hybrid transmission 10 with power sources 12, 14, 16 and 18 will be about 47 MPH, as designated at the second chain-line 270 on FIG. 5 with: the plot point 272 designating the engine speed in RPM versus the vehicle speed in MPH; the plot point 274 designating the speed of the first motor generator 14 in RPM versus the vehicle speed in MPH; and, the plot point 276 designating the speed of the second motor/generator 16 in RPM versus the vehicle speed in MPH.

To return to the description of the second mode of operation while the vehicle is moving in a forward direction, it will be appreciated that at the beginning of the second mode of operation, the second motor/generator 16 continues to operate as motor, as it has throughout the entire first mode. In fact, the second motor/generator 16 operates as a motor until the vehicle reaches a speed in excess of about 23 MPH, as represented at plot point 278 on curve 258, at which point it transitions to operation as a generator, and continues thereafter to operate as a generator until the mechanical point 280. At that point the track-laying vehicle will have reached a speed of about 42.8 MPH, and the second motor/generator 16 will transition from operation as a generator back to operation as a motor.

With the configuration of the transmission 10 heretofore described, and with the aforesaid number of teeth on the inner and outer gear members, the transmission 10 provides two mechanical points while operating in the second mode. That is, the first motor/generator 14 has a zero rotational speed at about 15.8 MPH, as designated by point 268 on curve 256. In addition, the second motor/generator 16 has a zero rotational speed at about 42.8 MPH, as designated by point 280 on curve 258. Hence, the transmission 10 provides two mechanical points in the second mode of operation.

It should be understood that the exact location of the aforesaid mechanical points is determined not only by the number of teeth on the inner and outer gear members of the planetary gear sub-sets, but also by the rotational speeds of the engine 12 in combination with the rotational speeds of the first and second motor/generators 14 and 16, respectively. Hence, with the number of teeth disclosed for the inner and outer gear members in the exemplary embodiment of the hybrid transmission 10, varying the speeds of the engine 12 and the motor/generators 14 and 16 may well shift the locations of the mechanical points to higher and lower vehicular speeds.

With respect to the power delivered to the output shafts 52 and 62 it should be appreciated that with the engine 12 operating at 2800 RPM to deliver 1200 horsepower and with the motor/generators 12 and 16 operating as motors capable of continuously delivering 680 horsepower at a maximum speed of 4400 RPM to provide 6000 foot-pounds at stall, each power output shaft 52 and 62 will deliver 1800 horsepower to provide a maximum of 44,500 foot-pounds at up to 2350 RPM.

c. Reverse Mode

When the ECU 244 has determined that the operator desires to move the vehicle rearwardly from a stationary condition, and to accelerate, the torque transfer device 22, serving as a clutch, is engaged operatively to connect the engine 12 to the hybrid transmission 10, and the torque transfer device 210 is applied. The torque transfer devices 134 and 220, however, are either disengaged or remain disengaged.

As in the forward drive range, the engine 12 is turning at slightly more than 2000 RPM as the vehicle begins to move in reverse, and the engine continues to operate at increasing speeds until it is operating at a consistent 2800 RPM, as depicted by plot curve 282 on FIG. 5. With the second motor/generator 16 operating as a motor, the rotor 152 in that motor/generator rotates, as depicted by plot curve 284 on FIG. 5, to drive the outer ring gear 168 of the third power distributing planetary gear subset 92. Because the sun gear 170 in the third power distributing planetary gear subset 92 is grounded to the housing 72, the carrier 176 in that planetary gear subset is walked, by rotation of the ring gear 168 along the rotatably grounded sun gear 170. By virtue of the sleeve shaft 182, the sun gears 190 and 194 of the reverse mode selecting planetary gear subset 94 and the first mode selecting planetary gear subset 96, respectively, are rotated in the same rotational direction as the carrier 176. With the carrier 206 of the reverse mode selecting planetary gear subset 94 rotatably grounded to the housing 172 by the torque transfer device 210, rotation of sun gear 190 effects counter rotation of the outer ring gear 198 in the reverse mode selecting planetary gear subset 94, which rotation is imparted to the carrier 202 of the first mode selecting planetary gear subset 96, and that rotation of the carrier 202 rotates the rib plate 216, and the power delivery shaft 36, in the opposite direction from the rotational direction of those structural members when the vehicle was to move forwardly.

When no steering input is applied, the rotor 230 in the steering motor 234 (FIG. 4) remains stationary such that the carrier 242 is immobilized between the rotatably grounded outer ring gear 222 and the inner sun gear 226 of the steering planetary gear subset 98. Hence, the sun gear 72 of the right output planetary gear subset 64 is likewise held stationary. As such, the outer, ring gear 66 of the right planetary gear subset 64 is rotated by the power delivery shaft 36 to drive the carrier 74, and thus the output shaft 62, in a direction that drives the track driven thereby to urge the vehicle rearwardly. With no steering input the power delivery shaft 36 likewise acts through the left output planetary gear subset 38 to effect rotation of output shaft 52 in that direction which moves the track controlled thereby to urge the vehicle rearwardly. The second motor/generator 16 continues to operate as a motor throughout the continued operation of the vehicle in reverse.

The rotor 152 in the first motor/generator 14 rotates, at speeds depicted by plot curve 286, to serve as a generator as the vehicle moves from a stopped position rearwardly until the vehicle reaches a speed of slightly less than about 12 MPH in reverse, at which time the first motor/generator 14 transitions from operation as a generator to operation as a motor. During that transition the rotor 102 of the first motor/generator 14 stops rotation, and the resulting mechanical point is designated by plot point 288 on curve 286.

With the components heretofore described the vehicle can move rearwardly at a top speed of about 13.5 MPH, as designated by plot point 290 on curve 286 as well as by plot point 292 on curve 284.

Operation—Steering as Vehicle Moves Forwardly or Rearwardly

When the vehicle is moving either forwardly or rearwardly steering is still accomplished by virtue of the interaction of the gear and shaft assembly 60 with the left and right output planetary gear subsets 38 and 64, respectively.

However, it is important to remember that as the vehicle is moving forwardly the left and right output shafts 52 and 62, respectively, are being driven by the respective ring gears 40 and 66 in the left and right output planetary gear subsets 38 and 64 which causes the planet gears 50 and 76 on the respective carriers 48 and 74 to walk about the immobilized sun gears 46 and 72. When the operator wants the vehicle to turn left, while the vehicle is continuing moving forwardly, he moves the pivotal lever 250 forwardly. In response to the input signal initiated by that movement of the pivotal lever 250, the steering input mechanism 246 activates the steering motor 234 which then drives the sun gear 226 in the steering planetary gear subset 98 to rotate the annular sleeve 98. In response to this rotation of the annular sleeve 98, the sun gears 46 and 72 in the respective output planetary gear subsets 38 and 64 are retro-rotated by the gear and shaft assembly 60, as previously explained in detail when describing the steering operation when the vehicle was being operated solely by the electrical energy supply source 18. When the engine 12 is connected to the hybrid transmission 10, this retro-rotation of the sun gears 46 and 72 impacts rotation of the carriers 48 and 74 by virtue of the fact that the ring gears 40 and 66 are now walking the planet gears 50 and 76 about retro-rotating sun gears 46 and 72 and not stationary sun gears.

Thus, when the operator has selected a left turn the relative rotation of the sun and ring gears 72 and 66 in the right output planetary gear subset 64 increases the rotational speed of the carrier 74 in that output planetary gear subset 64 with respect to the situation where the sun gear is immobilized, as when the vehicle is powered solely by the electrical energy source 18. To the contrary, but still considering the situation where the operator has selected a left turn, the relative rotation of the sun and ring gears 46 and 40 in the left output planetary gear subset 38 decreases the rotational speed of the carrier 48 in that output planetary gear subset 38, again with respect to the situation where the sun gear is immobilized, as when the vehicle is powered solely by the electrical energy source 18.

This differential speed between the rotation of the left and right carriers 48 and 74 in the respective left and right output planetary gear subsets 38 and 64 causes the right output shaft 62 to rotate faster than the left output shaft 52. This different rotational speed of the output shafts 52 and 62 maintains the continued forward motion of the vehicle but with the track driven by the output shaft 62 forcing the right side of the vehicle to be moving forwardly at a faster rate than the rate at which the track driven by the output shaft 52 is forcing the left side of the vehicle forwardly.

Hence, if the vehicle is moving forwardly in a straight line when the operator pivots the pivotal lever 250 forwardly, the vehicle continues to move forwardly but along an arcuate curve to the left. The arcuate left turn while moving forwardly will continue for so long as the operator maintains the pivotal lever 250 in its forward position. As soon, however, as the operator permits the right pivotal lever 250 to return to its neutral, at rest position the vehicle will cease moving along its arcuate path and continue to move forwardly in response to the accelerator or brake input and continue to respond to those inputs until the operator shifts the range selector to neutral.

When the operator selects a right turn while moving forwardly, the left pivotal lever 248 is moved forwardly. the relative rotation of the sun and ring gears 46 and 40 in the left output planetary gear subset 38 increases the rotational speed of the carrier 48 in that output planetary gear subset 38 with respect to the situation where the sun gear is immobilized, as when the vehicle is powered solely by the electrical energy source 18. To the contrary, but now considering the situation where the operator has selected a right turn, the relative rotation of the sun and ring gears 72 and 66 in the right output planetary gear subset 64 decreases the rotational speed of the carrier 74 in that output planetary gear subset 64, again with respect to the situation where the sun gear is immobilized, as when the vehicle is powered solely by the electrical energy source 18.

This differential speed between the rotation of the left and right carriers 48 and 74 in the respective left and right output planetary gear subsets 38 and 64 causes the left output shaft 52 to rotate faster than the right output shaft 62, and in a manner opposite to that described for making a left turn. That is, if the vehicle is moving forwardly in a straight line when the operator pivots the pivotal lever 248 forwardly, the vehicle continues to move forwardly but along an arcuate curve to the right. The resulting arcuate right turn while moving forwardly will continue for so long as the operator maintains the left pivotal lever 248 in it forward position. As soon, however, as the operator permits the left pivotal lever 248 to return to its neutral, at rest position the vehicle will cease moving along its arcuate path and continue to move forwardly in response to the accelerator or brake input and continue to respond to those inputs until the operator shifts the range selector to neutral.

The structure of the present hybrid transmission 10 similarly permits the operator to turn the vehicle while the vehicle is moving rearwardly. That is, steering in reverse is also accomplished by virtue of the interaction of the gear and shaft assembly 60 with the left and right output planetary gear subsets 38 and 64, respectively. The most significant difference is that in reverse the power delivery shaft 36 is rotating counter the direction in which it was rotating when the vehicle was moving forwardly.

Briefly, the retro-rotation of the sun gears 40 and 72 in the respective output planetary gear subsets 38 and 64 still achieves relatively different rotational rates for the carriers 48 and 74, and thus the output shafts 52 and 62. However, with the power delivery shaft 36 turning in the opposite direction, one must achieve a greater rate of rotation for the carrier 48 in the left output planetary gear subset 38 than for the carrier 74 in the right output planetary gear subset 64 to achieve an arcuate right turn while moving rearwardly. This may be accomplished either by wiring the steering input mechanism 246 to achieve the desired input signal from the steering input mechanism 246 to the steering motor 234 by pivoting the left pivotal lever 248 rearwardly so that the operator input is intuitive. Obviously, if one is using a steering wheel rather than pivotal levers, the wheel may be turned to the right to achieve a right turn while moving either forwardly or rearwardly.

Conversely, one must achieve a greater rate of rotation for the carrier 74 in the right output planetary gear subset 64 than for the carrier 48 in the left output planetary gear subset 38 to achieve arcuate left turn while moving rearwardly. This may be accomplished either by wiring the steering input mechanism 246 to achieve the desired input signal from the steering input mechanism 246 to the steering motor 234 by pivoting the right pivotal lever 250 rearwardly so that the operator input remains intuitive. Here, too, if a steering wheel is employed, a left turn of the wheel will achieve a left turn for the vehicle irrespective of whether the vehicle is moving forwardly or rearwardly.

Summation

A two-mode, compound-split, electro-mechanical transmission such as that identified by the numeral 10, which embodies the concepts of the present invention, employs a plurality of planetary gear subsets to provide the two-mode operation when operatively controlled by three torque transfer devices. A fourth torque transfer device is utilized to disconnect the internal combustion engine 12 from the hybrid transmission. Moreover, even when eight planetary gear subsets 38, 64, 88, 90, 92, 94, 96 and 98 are employed all of the planetary gear subsets, as well as both motor/generators 14 and 16, may be coaxially disposed in order to minimize the required envelope—i.e.: circumferential dimension—of the transmission 10. However, they need not be so disposed to accomplish the objectives of the present invention. Thus the present invention is, therefore, readily adapted to hybrid transmissions wherein the motor/generators are laterally offset from the remainder of the transmission—i.e., the well known countershaft configuration.

Conclusion

While only a preferred embodiment of the present invention is disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

As should now be apparent, the present invention teaches that a transmission embodying the concepts of the present invention is not only particularly suited for use with tracklaying vehicles but is also capable of "silent operation" and fulfilling the remaining aspects of the invention.

What is claimed is:

1. A two-mode, compound-split, electro-mechanical transmission that is particularly adapted for use with tracklaying vehicles, said transmission and its related operating mechanism comprising:

a prime mover power source in the mature of an internal combustion engine for delivering power to said transmission and its related operating mechanism;

a source of electrical energy for delivering power to said transmission and its related operating mechanism;

first and second motor/generator units;

a steering motor;

first, second and third power distributing planetary gear subsets, first and reverse mode selecting planetary gear subsets, a steering planetary gear subset and left and right output planetary gear subsets incorporated in said transmission mechanism;

said left and right output planetary gear subsets presenting left and right output shafts, respectively;

said first motor/generator unit directly connected to said first power distributing planetary gear subset;

said second motor/generator unit directly connected to all three power distributing planetary gear subsets;

separate first and reverse mode-selecting torque transfer devices for selectively grounding selected components of said compounded first and reverse mode selecting planetary gear subsets;

a second mode selecting torque transfer device selectively, and simultaneously, connecting said first and second power distributing planetary gear subsets operatively to said left and right output planetary gear subsets;

a steering mechanism for operating said steering motor;

said source of electrical energy, said steering mechanism, said steering motor and said motor/generator units communicating with each other by virtue of an electrical control unit;

said left and right output planetary gear subsets being connected to each other by a retro-rotational gear shaft assembly so that said left and right output shafts may rotate in the same or opposite directions and at the same of different speeds, one with respect to the other.

2. An electro-mechanical transmission, as set forth in claim 1, wherein:

a power delivery shaft is employed operatively to connect said first and second power distributing planetary gear subsets to said left and right output planetary gear subsets.

3. An electro-mechanical transmission, as set forth in claim 2, wherein:

each planetary gear subset has a plurality of components in the nature of an inner, sun gear, an outer, ring gear circumscribing said inner, sun gear and a plurality of planet gears rotatably mounted on a carrier such that the planet gears each simultaneously mesh with the inner, sun gear and the outer, ring gear of the planetary gear subset in which said carrier is incorporated;

the carrier of said left output planetary gear subset presents said left output shaft;

the carrier of said right output planetary gear subset presents said right output shaft;

the outer, ring gears of said left and right output planetary gear subsets are connected to each other by said power delivery shaft which assures simultaneous rotation of said outer, ring gears of said left and right output planetary gear subsets in the same direction; and, the inner, sun gears of said left and right output planetary gear subsets are connected to each other by a retro-rotational gear and shaft assembly so that said inner, sun gears of said output planetary gear subsets may only rotate in opposite directions, one with respect to the other.

4. An electro-mechanical transmission, as set forth in claim 3, wherein:

said first and second power receiving planetary gear subsets are compounded in that carrier of said first power distributing planetary gear subset is secured to the outer ring gear in said second power distributing planetary gear subset;

said internal combustion engine is operatively connected to the carrier of said second power distributing planetary gear subset;

a clutch is interposed between said internal combustion engine and the carrier in said second power distribution planetary gear subset; and, said mode selecting torque transfer device is disposed between the carrier in said first power distributing planetary gear subset and the power delivery shaft connected to said outer, ring gears of said left and right output planetary gear subsets.

5. A two-mode, compound-split, electro-mechanical transmission that is particularly adapted for use with track-laying vehicles, said transmission comprising:

a housing to receive the transmission mechanism in such a manner that the housing is adapted selectively to ground certain components of the transmission mechanism against rotation;

a prime mover power source in the nature of an internal combustion engine for delivering power to said transmission mechanism;

first, second and third power receiving planetary gear subsets, first and reverse mode selecting planetary gear subsets, a steering planetary gear subset and left and right output planetary gear subsets incorporated in said transmission mechanism;

each planetary gear subset having a plurality of components in the nature of an inner, sun gear, an outer, ring gear circumscribing said inner, sun gear and a plurality of planet gears rotatably mounted on a carrier such that the planet gears each simultaneously mesh with the inner, sun gear and the outer, ring gear of the planetary gear subset in which the carrier is incorporated;

first and second motor/generator units; said first motor/generator unit directly connected to said first power receiving planetary gear subset;

said second motor/generator unit directly connected to all three power receiving planetary gear subsets;

said first and second power receiving planetary gear subsets being compounded in that carrier of said first power receiving planetary gear subset is secured to the outer ring gear in said second power receiving planetary gear subset;

a second operating mode selecting torque transfer device selectively connecting the carrier in said first power receiving planetary gear subset to the carriers in said left and right output planetary gear subsets; a steering motor;

a steering mechanism for operating said steering motor;

separate first and reverse operating mode selecting torque transfer devices for selectively grounding selected components of said first and second mode selecting planetary gear subsets;

the carrier of said left output planetary gear subset presenting a left output shaft;

the carrier of said right output planetary gear subset presenting a right output shaft;

the outer, ring gears of said left and right output planetary gear subsets being connected to each other by a shaft which assures simultaneous rotation of said outer, ring gears of said left and right output planetary gear subsets in the same direction;

said inner, sun gears of said left and right output planetary gear subsets connected to each other by a retro-rotational gear shaft assembly so that said inner, sun gears of said output planetary gear subsets may only rotate in opposite directions, one with respect to the other.

* * * * *